US007959295B2

(12) United States Patent
Richards et al.

(10) Patent No.: US 7,959,295 B2
(45) Date of Patent: Jun. 14, 2011

(54) SPECTRAL SEPARATION FILTERS FOR 3D STEREOSCOPIC D-CINEMA PRESENTATION

(75) Inventors: Martin John Richards, Redwood City, CA (US); Gary D. Gomes, Fremont, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 1004 days.

(21) Appl. No.: 11/804,602

(22) Filed: May 18, 2007

(65) Prior Publication Data

US 2008/0284982 A1 Nov. 20, 2008

(51) Int. Cl.
G03B 21/14 (2006.01)
G02B 27/22 (2006.01)
G02B 13/00 (2006.01)

(52) U.S. Cl. ............... 353/7; 353/84; 359/464

(58) Field of Classification Search ............... 353/7, 84; 359/464, 885–892; 352/60, 63; 348/51, 348/60; 349/15
See application file for complete search history.

(56) References Cited

U.S. PATENT DOCUMENTS

| | | | |
|---|---|---|---|
| 1,986,966 A | 1/1935 | Godwin | |
| 1,993,272 A | 3/1935 | Godwin | |
| 4,134,644 A | 1/1979 | Marks | |
| 4,189,210 A | 2/1980 | Browning et al. | |
| 4,247,177 A | 1/1981 | Marks | |
| 4,740,836 A | 4/1988 | Graig | |
| 5,218,386 A | 6/1993 | Levien | |
| 5,537,476 A | 7/1996 | Coteus et al. | |
| 5,614,920 A | 3/1997 | Coteus et al. | |
| 5,619,219 A | 4/1997 | Coteus et al. | |
| 6,142,624 A | 11/2000 | Morris et al. | |
| 6,283,597 B1 | 9/2001 | Jorke | |
| 6,698,890 B1 | 3/2004 | Jorke | |
| 6,777,070 B1 | 8/2004 | Murata et al. | |
| 6,847,483 B2 | 1/2005 | Lippey et al. | |
| 6,867,775 B2 | 3/2005 | Buck et al. | |
| 7,001,021 B2 | 2/2006 | Jorke | |
| 7,273,282 B2 * | 9/2007 | Przybyla et al. | ........... 353/31 |
| 7,686,455 B2 * | 3/2010 | Yoshimura et al. | ........... 353/31 |

(Continued)

FOREIGN PATENT DOCUMENTS

DE 10057102 A1 5/2002

(Continued)

OTHER PUBLICATIONS

International Search Report mailed Mar. 12, 2008, International Application PCT/US2008/006007.

(Continued)

*Primary Examiner* — William C Dowling
(74) *Attorney, Agent, or Firm* — John W. Carpenter

(57) ABSTRACT

Spectral separation filters for channels of a 3D image projection incorporate passbands of primary colors. In at least one of the filters, passbands are present in more than 3 primary colors. A set of two filters include a first filter having passbands of low blue, high blue, low green, high green, and red, and a second filter having passbands of blue, green, and red. The additional primary passbands of the first filter allow for an increased color space in projections through the filters compared to filters only having red, green, and blue primaries. The added flexibility of the increased color space is utilized to more closely match a color space and white point of a projector in which the filters are used.

41 Claims, 8 Drawing Sheets

Left Channel (———) and Right Channel (- - - -) Projection Filter Passbands

U.S. PATENT DOCUMENTS

| | | |
|---|---|---|
| 7,784,938 B2 | 8/2010 | Richards |
| 2004/0233524 A1 | 11/2004 | Lippey et al. |
| 2005/0036119 A1 | 2/2005 | Ruda |
| 2005/0225630 A1* | 10/2005 | Childers et al. ............... 348/51 |
| 2005/0231800 A1 | 10/2005 | Lippey et al. |
| 2006/0011617 A1 | 1/2006 | Covarrubias et al. |
| 2007/0127121 A1 | 6/2007 | Maximus et al. |
| 2007/0236617 A1 | 10/2007 | Lippey |
| 2007/0236809 A1* | 10/2007 | Lippey et al. ............... 359/722 |
| 2007/0247709 A1* | 10/2007 | Karakawa ................. 359/464 |
| 2008/0151193 A1* | 6/2008 | Reder ............................. 353/7 |
| 2008/0278574 A1* | 11/2008 | Ramstad ...................... 348/51 |
| 2010/0013911 A1* | 1/2010 | Jacobs et al. ................ 348/54 |
| 2010/0060857 A1* | 3/2010 | Richards et al. ................ 353/7 |
| 2010/0066813 A1 | 3/2010 | Jorke |
| 2010/0066976 A1 | 3/2010 | Richards |
| 2010/0067108 A1* | 3/2010 | Richards et al. ............. 359/464 |
| 2010/0073769 A1 | 3/2010 | Richards |

FOREIGN PATENT DOCUMENTS

| | | |
|---|---|---|
| DE | 10249815 A1 | 5/2004 |
| DE | 10359788 A1 | 4/2005 |
| EP | 2116067 A0 | 5/2008 |
| JP | 62254594 A | 6/1987 |
| JP | 1116521 A | 5/1989 |
| JP | 2001326949 A | 11/2001 |
| KR | 1019870001837 B1 | 10/1987 |
| KR | 2019960006160 Y1 | 7/1996 |
| KR | 1020020050042 A | 6/2002 |
| KR | 100445898 B1 | 8/2003 |
| KR | 1020050102282 A | 10/2005 |
| WO | 9849837 | 11/1998 |
| WO | 9849837 A1 | 11/1998 |
| WO | 0111894 A2 | 2/2001 |
| WO | 2005039192 A1 | 4/2005 |
| WO | 2005099279 A1 | 10/2005 |
| WO | 2007118114 | 10/2007 |
| WO | 2007118114 A2 | 10/2007 |

OTHER PUBLICATIONS

Korean Search Report mailed Jan. 14, 2010, Korean Appln. 10-2009-7019630.

* cited by examiner

Left Channel (———) and Right Channel (- - - -) Projection Filter Passbands

SPECTRAL SEPARATION FILTERS FOR 3D STEREOSCOPIC D-CINEMA PRESENTATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to viewing systems and products for viewing spectrally separated three dimensional (3D) images. The invention is more particularly related to projection filters used in Digital Cinema (D-Cinema) Theatre and improves current methods for projecting a 3D stereoscopic movie.

2. Discussion of Background

Methods for 3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there is a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

SUMMARY OF THE INVENTION

The present inventors have realized the need for improvements in spectral separation filters, and particularly those used in 3D D-Cinema applications. One problem realized is that typical 3-D projection systems have low luminance efficiency in that color spaces, color gamut, and effective brightness are inadequate. Another problem realized is that imbalance between luminance levels in channels of 3D projections decreases luminal efficiency.

The present invention addresses some of the problems with the Spectral Separation method for projecting 3D images, specifically an improvement in the efficiency, increase in the color gamut, and a reduction in the amount of color compensation required. In some cases, the color compensation may not be required.

The present invention addresses the efficiency and color space issues by splitting primary colors of the projector into subparts. The splitting of primary colors into subparts is accomplished in part through the filter installed in the projector, which is the main controlling factor in the color space of the system. The efficiency and color gamut of the projected image are both increased using the additional subparts of the split primary colors.

In one embodiment, the present invention provides a projector filter, comprising, a first filter having a first set of primary passbands, and a second filter having a second set of primary passbands, wherein the first set of primary passbands has a different number of primary passbands than the second filter. The first filter has, for example, at least two blue primary passbands and the second filter has at least one blue primary passband. The first filter may also have, for example, at least two green primary passbands and the second filter has at least one green primary. For example, the first filter may have passband wavelengths of approximately 400 to 440 nm and 484 to 498 nm, 514 to 528 nm, 567 to 581 nm, and to 623 nm, and the second filter may have passband wavelengths of approximately 455 to 471 nm, 539 to 556 nm, and to 700 nm. The passbands of the first filter and the second filter are, for example, selected to maximize reproduction of a color space of a D-Cinema projector.

The present invention may also be realized as a system for projection of spectrally separated 3D images, comprising, a projection system configured to project left and right channel images for display by a viewer, a filter placed in at least one light path of the projection system comprising a left channel filter and a right channel filter, wherein at least one of the left and right channel filters has more than 3 primary passbands. In one embodiment, one of the left and right channel filters has at least 2 primary passbands in blue wavelengths and one of the left and right channel filters has at least 2 primary passbands in green wavelengths. Again, the primary passbands of the filters are selected to maximize reproduction of a color space of the projection system in images projected by the projection system. The system may include, for example, a color correction module configured to color correct images projected by the projection system according to a color space of the filters.

The invention may also be embodied as a set of filters, comprising a first filter having a first set of primary color passbands, a second filter having a second set of primary color passbands of different wavelengths compared to the first set of primary colors, wherein the first filter has more than one primary color in at least one color band.

The present invention may also be embodied as a method, comprising the steps of, preparing a 3D image comprising a left image and a right image, filtering the left image with a left channel filter, filtering the right image with a right channel filter, and projecting the left and right filtered images onto a screen, wherein at least one of the left channel filter and right channel filter have more than 3 primary passbands. As in all of the above described embodiments, the filters (e.g., filters used in performing the steps of filtering) may themselves be embodied in an electronically switchable filter set, fixed filters in a two projector system, or a filter wheel wherein approximately ½ the wheel has filter characteristics of a left channel filter according to the present invention and approximately ½ the wheel has filter characteristics of a right channel filter according to the present invention.

Portions of both the system and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and coax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

As noted above, the present invention addresses some of the problems with the Spectral Separation method for projecting 3D images, specifically an improvement in the efficiency, increase in the color gamut, and a reduction in the amount of color compensation required. In some cases, the color compensation may not be required.

Figure 1:
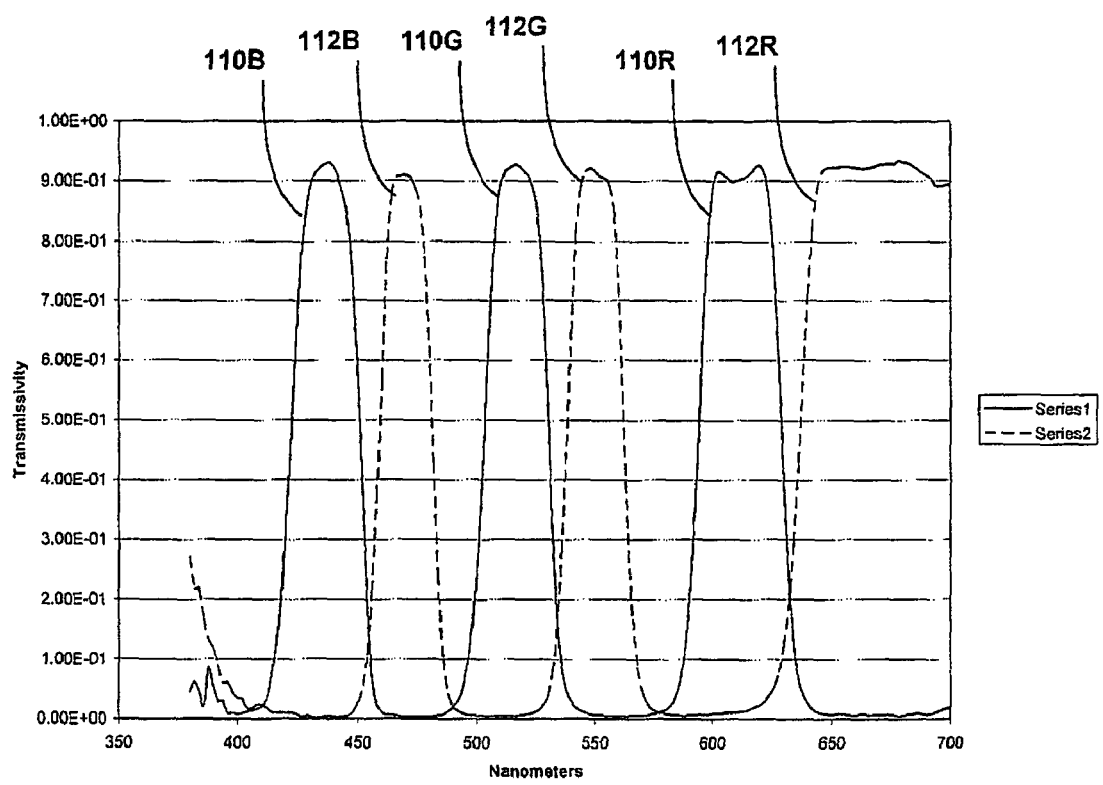
FIG. 1 is a graph of conventional left and right spectral separation filters.

Referring now to the drawings, wherein like reference numerals designate identical or corresponding parts, and more particularly to FIG. 1 thereof, there is illustrated a set of left and right spectral separation filters representative of those currently used in D-Cinema 3-Dimensional (3D) presentations. As shown in FIG. 1, the conventional spectral separation filters provide three primaries for each eye by dividing the red, green, and blue color channels of a projector into two sets of primaries, one set for the left eye (primaries 110R, 110G, and 110B) and one set for the right eye (primaries 112R, 112G, and 112B). For example, the left eye is illustrated as having shorter wavelength blue, green, and red bands than the right eye. Following a conventional design, the left eye may have, for example, passband wavelengths of approximately 400 to 445 (blue), 505 to 525 (green), and 595 to 635 (red). The right eye may have, for example, passband wavelengths of approximately 455 to 495 (blue), 535 to 585 (green), and 645 to 700 (red).

While a filter configuration like that illustrated in FIG. 1 provides all three colors to each eye, the resulting image has a somewhat different hue in each eye. In order to make the images more closely match the colors for each eye, and match the colors in the original image, color correction is applied. The color correction reduces the overall efficiency of the system (since it boosts some primaries preferentially over others). In addition, even with color correction, the new left and right primaries do not have as large of a color space as the projector, and thus can only produce a portion, but not every color that would be present if projected without the filters in a 2D system.

Figure 2:
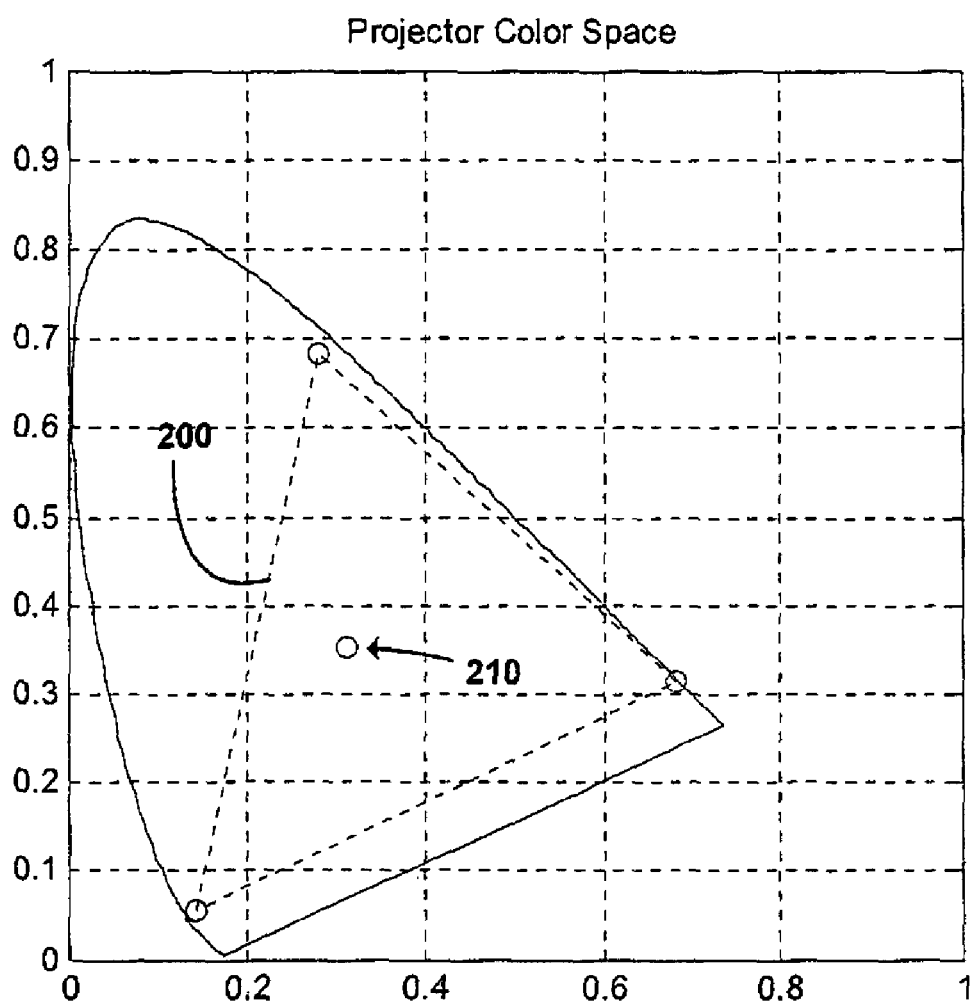
FIG. 2 is a 1931 CIE chromaticity diagram illustrating the color space of a typical Digital Cinema (D-Cinema) projector.

FIG. 2 is a 1931 CIE chromaticity diagram illustrating the unfiltered color space 200 and P3 white point 210 of a typical Digital Cinema (D-Cinema) projector. The unfiltered color space of the projector represents the color space available for projecting images.

Figure 3:
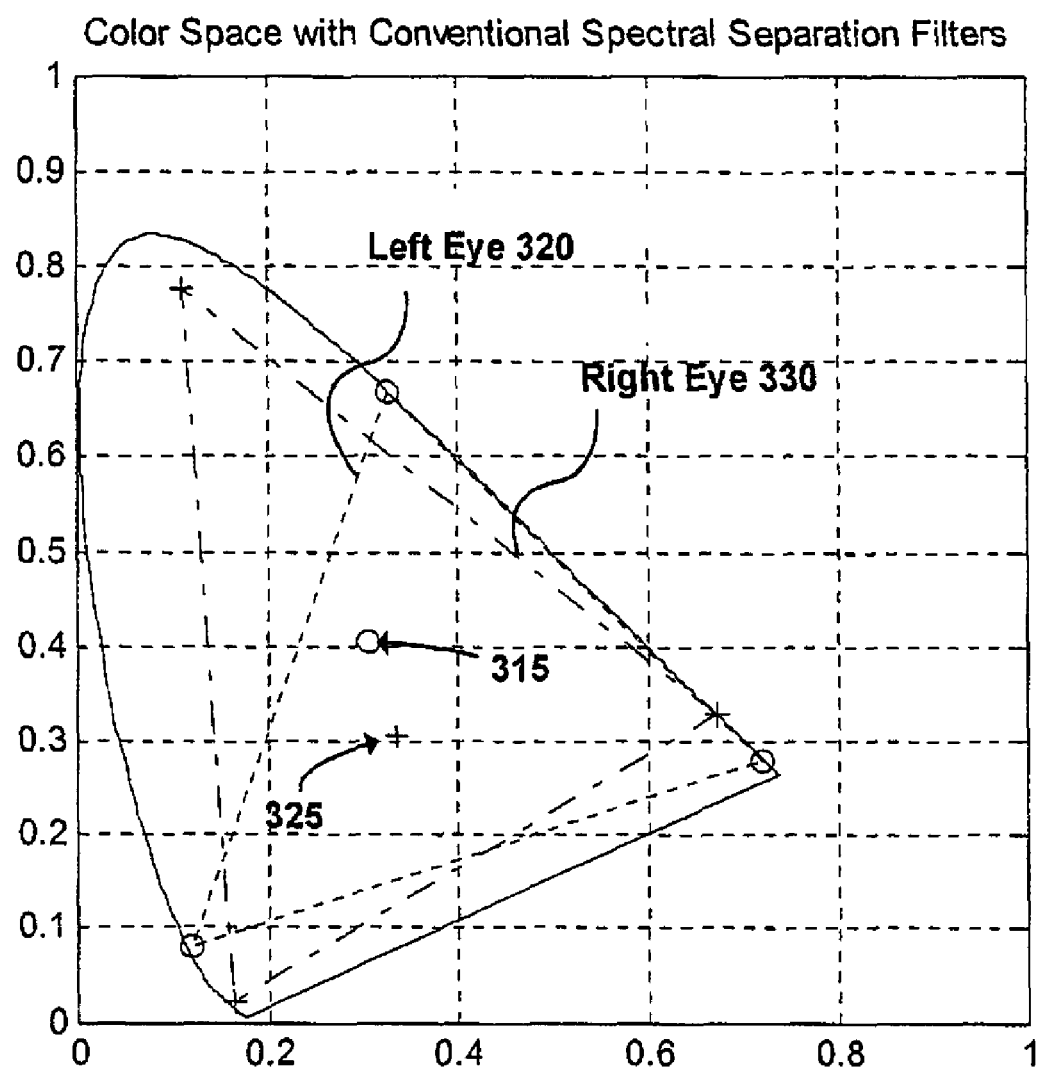
FIG. 3 is a 1931 CIE chromaticity diagram illustrating the color space of conventional spectral separation filters.

FIG. 3 is a 1931 CIE chromaticity diagram illustrating the color space of conventional spectral separation filters used to separate the left eye channel 320 and right eye channel 330 in a D-Cinema projector. The intersection of the left and right eye channel color spaces represents the potential color space of images projected through the filters. As can be seen in FIG. 3, the potential color space using the conventional filters is restricted compared with the projector color space (200, FIG. 2). In addition, the P3 white point 310 is an important factor in the overall result of the projected image, and is significantly shifted compared to that of the projector alone—see P3 white point 315 for the left eye and P3 white point 325 for the right eye and compare to projector P3 white point 210, shown for reference in FIG. 3.

The present invention pertains to the filter installed in the projector, which is the main controlling factor in the color space of the system. The invention addresses both the efficiency and the color space issues by splitting at least one of the projector primaries into subparts. In one embodiment, the blue and green projector primaries are split into three sub-parts each. The exact wavelengths of where the primary is split may be chosen in any manner that takes into account the particular color space to be reproduced.

Figure 4:
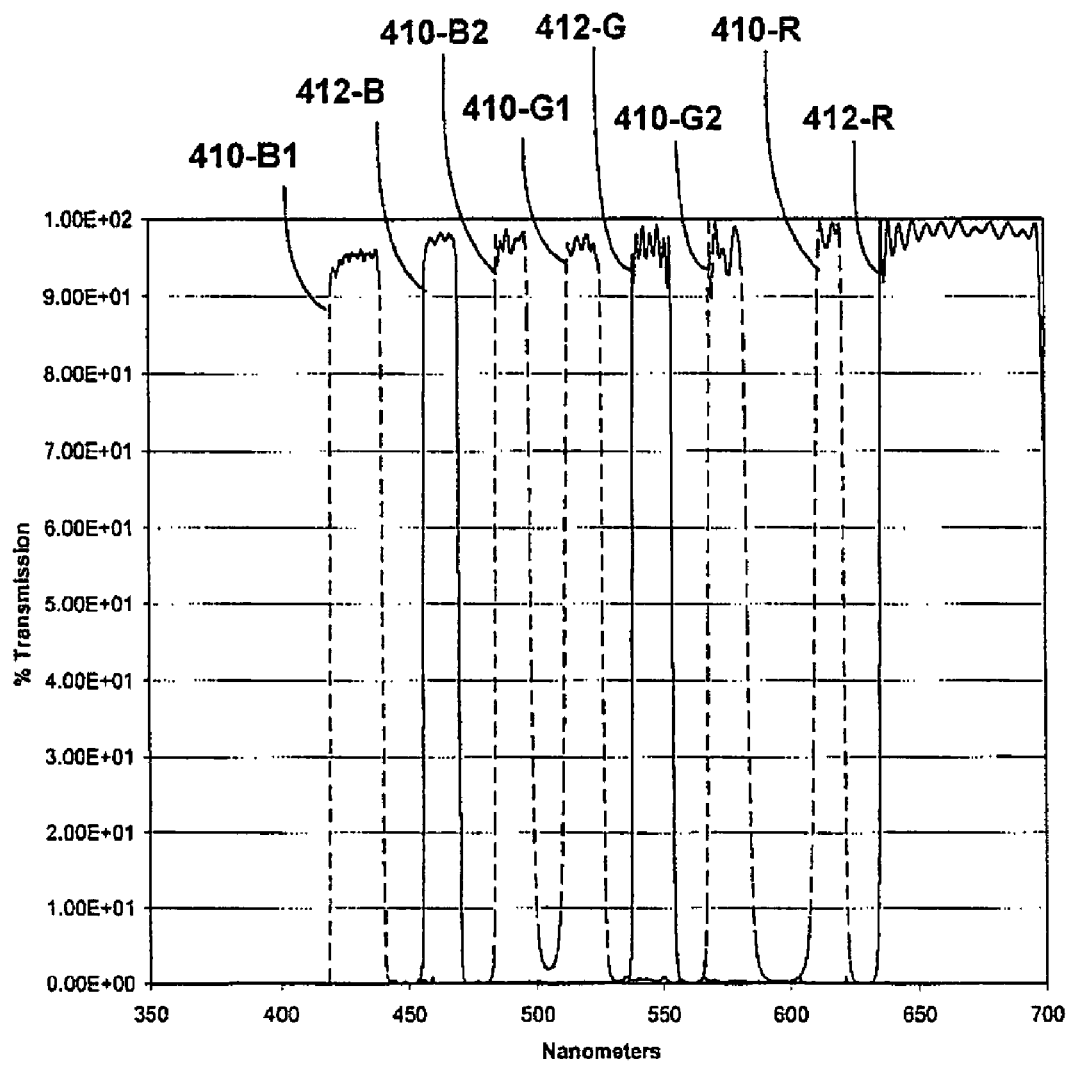
FIG. 4 is a graph of left and right projector filters according to an embodiment of the present invention.

For example, as shown in FIG. 4, in one potential configuration, a right channel projection filter has passband wavelengths of blue at 400 to 440 (410-B1) and 484 to 498 nm (410-B2), green at 514 to 528 (410-G1) and 567 to 581 nm (410-G2), and red at 610 to 623 nm (410-R). A left channel projection filter has passbands wavelengths of blue at 455 to 471 nm (412-B), green at 539 to 556 nm (412-G), and red at 634 to 700 nm (412-R). Of course other permutations exist, such as, for example, switching the left and right channel wavelengths, or switching the green and blue wavelengths etc. In addition, the passband wavelengths are approximate and each band may vary by, for example +/−5 nm or more. Such variations may occur by shifting the entire passband and/or by selecting one or more different endpoints for the passbands. An important consideration is that such variances should not reduce the guard band between passbands to a level where a system using the filters incurs unacceptable levels of crosstalk between the channels.

The selection of passband wavelengths is made such that when an image is projected with a D-Cinema projector with a P3 white point 210 and color space 200 as, for example, shown in FIG. 2, the resultant color space in the channels, and more particularly the combined color spaces of the projected images, have a color space and white point that more closely match the color space 200 and P3 white point 210 compared to the color space and white point that occurs when using conventional spectral separation, such as shown in FIG. 3. The passbands are also chosen to maximize efficiency by selecting passbands that will result in having approximately the same, or balanced, luminance levels in each channel. So long as sufficient bandwidth is available in each passband to achieve the stated improvements (as, for example, proven by experimental results), there are no theoretical limits on the variances that may occur over the example passband wavelengths described herein.

Note that there are gaps in the spectrum of colors that did not exist in the previous design (for example between 498 nm and 514 nm for blue to green transition in the right channel, and between 581 nm and 610 nm for the green to red transition in the right channel). These notches are designed to increase the color space so that it matches the P3 color space in D-Cinema projectors. The filter response needed to get the correct P3 result was derived using the real (measured) spectral response from the D-Cinema projectors, which is reflected in the chosen wavelengths for the passbands described above.

Also note that in the illustrated example, the three sub-parts are structured such that they are interleaved between the right and left channels. From a practical standpoint, this means that the three sub-parts are arranged such that one filter has at least one sub-part lower and one sub-part higher than the sub-part of the other filter. For example, in FIG. 4, the blue passbands of the right channel projection filter straddle the blue passband of the left channel projection filter. Such interleaving is preferably maintained in the various embodiments, including those embodiments that divide passbands into more than 3 sub-parts. Although theoretically there is no limit on the number of sub-parts in which any passband may be divided, due to cost and other factors, a point of diminishing returns is quickly reached and 3 sub-parts each of blue and green and 2 sub-parts of red appears to have the greatest return with reasonable cost. With improved components and/or reduced costs of components, a different economic analysis may result and 4, 5, or more sub-parts, including additional sub-parts in the red, may be justified for additional incremental increases in the color space. Such incremental improvements might also be justified under current economic and cost models for upper end equipment markets.

Figure 5:
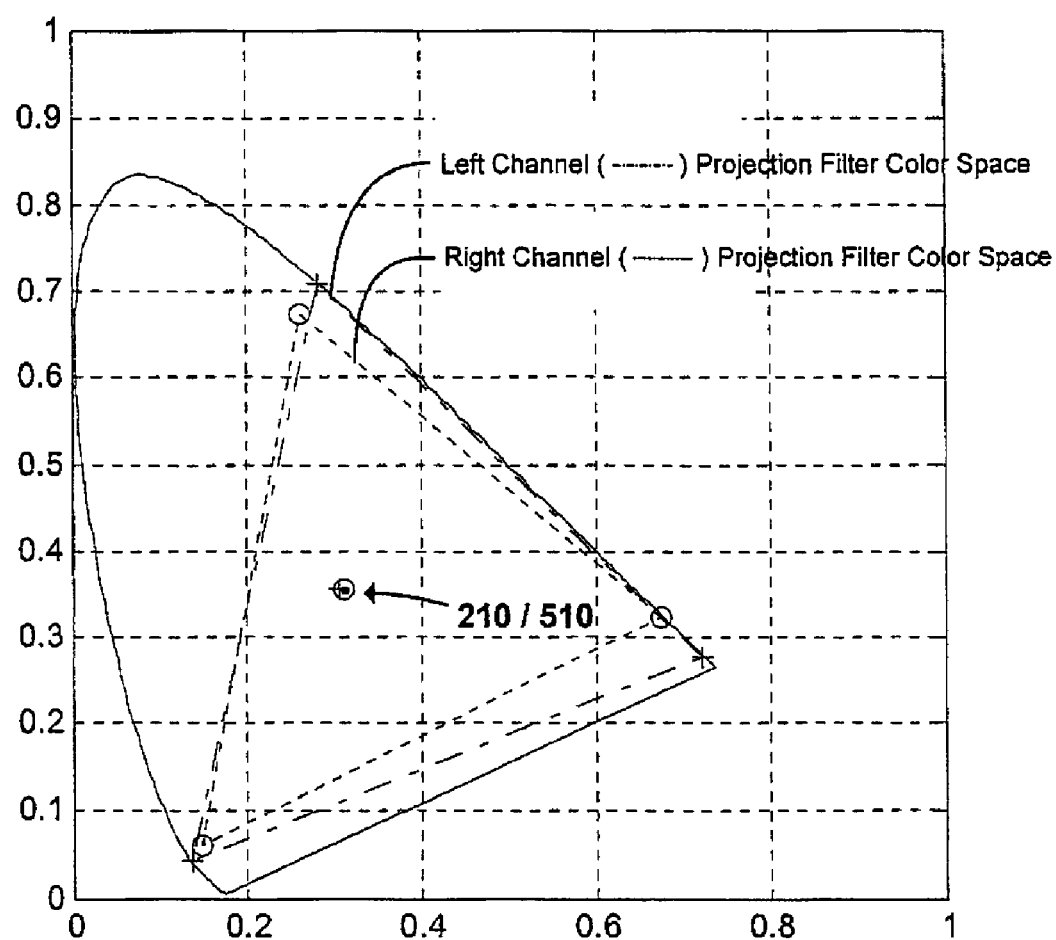
FIG. 5 is a 1931 CIE chromaticity diagram illustrating the color space of color filters according to an embodiment of the present invention.

FIG. 5 shows the color space diagrams for the filters of this invention described above. As can be seen in FIG. 5, the intersection, or product, of the left channel projection filter color space and right channel projection filter color space results in a color space more closely matching the color space 200 (FIG. 2) than which occurs with conventional spectral separation. Some portions of the color space are reduced and other portions of the color space are increased. Although some areas of the color space are reduced, the reduced areas are less important to viewers. Areas of the color space to which viewers are more sensitive have made significant gains with the invention versus conventional spectral separation.

Figure 6:
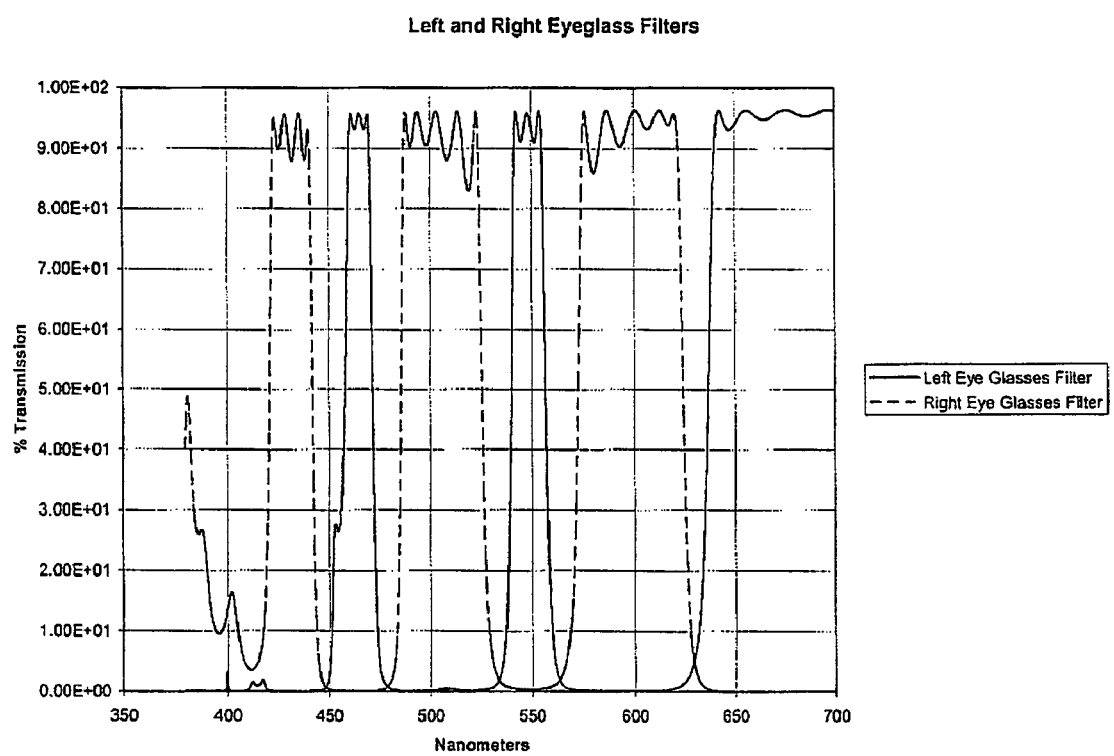
FIG. 6 is a graph of left and right eyeglass filters that may be applied in conjunction with the projector filters described in FIG. 4.

Glasses used to view the projected images need not be as complex as the projector filter since the notches that provide the improved color space have no impact on the left/right eye (or left/right channel) separation, and therefore the notches do not need to be reproduced in the viewing filters of the glasses (the projector filter has more bands, and therefore more complexity than the viewing filters). As shown in FIG. 6, in one configuration the right eye lens of the glasses would have a filter with passband wavelengths of approximately 430 to 440 nm (part of the blue band), 484 to 528 nm (part of the blue, and part of the green band), 568 to 623 (part of the green band and the red band), which encompass the passbands of the right channel projector filter. The left eye lens of the glasses would have a filter with passband wavelengths of 455 to 471 (blue), 539 to 555 nm (green), and 634 to 700 nm (red) which encompass the passbands of the left channel projector filter. Wavelengths below the beginning wavelengths in the blue (approximately 430 nm) and wavelengths above ending wavelengths in red (approximately 700 nm) are beyond the visible spectrum and may either be included or excluded from the passbands. Other permutations exist as described before (including left/right channel exchange), but the left and right eye lenses of the glasses include corresponding permutations that encompass or match the left and right channel projector filter permutations.

Along with other factors such as projector color space and white point, the final images viewed through the glasses are a product of the projecting filters and viewing filters (e.g., filters in the glasses used to view the images). In the described embodiments, the receiving filters are less demanding as far as passband design because they have fewer notches and they generally encompass more wavelengths in at least some of the passbands. The important role played by the glasses is separation of the entire images as whole and as projected, not specific bands within each image as described for the projection filters.

The overall response (color space and white point) to the eye is the product of the spectral response of the projector filter(s), the lenses/filters of the eyeglasses, and the base D-Cinema projector response (color space and white point of the D-Cinema projector without the left and right channel projector filters). Nevertheless, the color space is mostly defined by the position of the passbands and the notches in the yellow and blue-green bands, and therefore the overall response is mostly a function of the projector filter (because the glasses do not need and preferably do not have the notches).

In part, because of the lower complexity of the eyeglass (or viewing) filters, the eyeglass filters are also comparatively less expensive to produce compared to the projection filters. This is a benefit because the eyeglass filters are generally embodied as a pair of glasses worn by viewers (including the general public), and are therefore likely to be subjected to less than perfect care, whereas the projector equipment including the projector filters are generally kept in more secure and stable environments. In addition, the glasses are generally purchased in larger numbers than the projector filter(s).

Another aspect of the differing complexities of the eyeglass (or viewing) filters compared to the projector filters is that they create an asymmetric filtering system. That is, each viewing filter and its corresponding projection filter of the same channel are not symmetric in bandwidth and/or the number of passbands. The passbands of the viewing filters may also entirely encompass the passbands of the projection filters (and, in some embodiments, the passbands of the projector filter may be blue-shifted relative to the passbands of the viewing filters to account for viewing angle related blue shifts in the viewing filters). Regardless of whether the projection filters are entirely encompassed by the passbands of the viewing filters, the passbands of the viewing and projection filters preferably are different. Therefore, a preferred result is an asymmetric filtering system.

The particular projector filter response used in describing the invention uses 3 divisions of the blue and green projector color bands. The red band is divided into two parts (one part for the right channel and one part for the left channel). Additional divisions may be utilized for increased color space, but additional cost of the filters may be incurred. Careful selection of the optical passbands provides a close match to the color space and white point of the original unfiltered projector. The design of the glasses is such they have the same complexity of the conventional spectral separation design, but provide adequate selectivity to minimize crosstalk between the images projected in the left and right channels.

Figure 7:
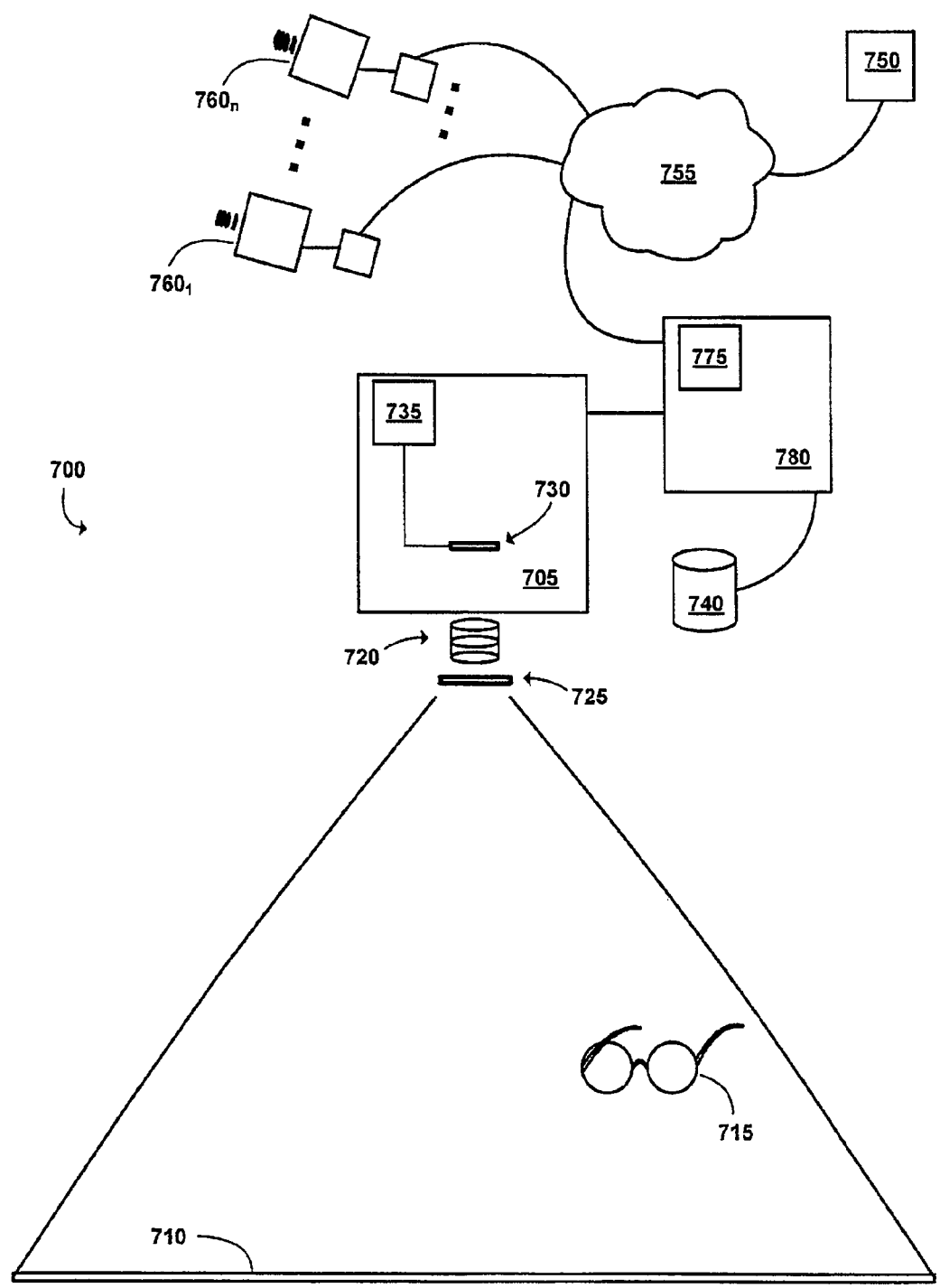
FIG. 7 is a block diagram of a projection system according to an embodiment of the present invention.

FIG. 7 is a block diagram of a projection system 700 according to an embodiment of the present invention. The projection system 700 includes a digital cinema projector 705 that projects spectrally separated 3D images (a left channel image and a right channel image) through projection filter 730 and projection lens 720 onto a screen 710 for viewing with glasses 715. Glasses 715 include, for example spectrally separated filters disposed as coatings on each lens of the glasses such that the right lens comprises a filter that matches or encompasses the passbands of the right channel filter and the left lens comprises a filter that matches or encompasses passbands of the left channel filter (each of the left and right channel images are intended to be viewed by a viewer's corresponding left or right eye through the corresponding left or right eye lens/filter of the glasses). The glasses 715, and system 700, may, for example, include any of the features, systems, or devices described in Richards et al., a U.S. patent application entitled METHOD AND SYSTEM FOR SHAPED GLASSES AND VIEWING 3D IMAGES, Ser. No. 11/801,574, filed May 9, 2007, the contents of which are incorporated herein by reference as if specifically set forth.

The projector 705 receives image data for projection from a server 780. 3D content is provided to the server 780 from, for example, a disk drive 740. Alternatively, 3D content may be transmitted to projector 705 over a secure link of network 755 from, for example, an image warehouse or studio 750. Multiple other projectors (e.g., at theaters around the globe, $760_1 \ldots 760_n$) may also feed from similar network or other electronic or wireless connections including wireless networks, satellite transmission, or quality airwave broadcasts (e.g., High Definition or better broadcast).

The server 780 includes color correction module 775 that performs mathematical transformations of color to be reproduced by the projector prior to image projection. The mathematical transformations utilize image data for each of the left and right channels and transform them into parameters consistent with the primary colors or passbands of the corresponding left or right channel filter. The mathematical transformation, or color corrections, adjust the hue of each image and maximize the available color space and match the color space and white point of projector 705 as closely as possible. The amount of color correction required when using the invention is significantly reduced when compared with conventional spectral separation.

The color corrected 3D content is transmitted to projector 705. The 3D content includes left and right channel images that switch at a rate fast enough that they blend into a single 3D image when viewed by a viewer through glasses 715. At some point in the optical path of the projection system, filters according to the present invention are utilized. For example, a filter wheel 730 is placed at point in the optical path closer to the light source. Alternatively, an electronically switched filter 725 is placed, for example, after the projection lens 720.

A controller 735 provides signals that maintain synchronization between the filter 730 and the image being projected. For example, features of a left channel filter according to the present invention are active when a left channel image is being projected, and features of a right channel filter according to the present invention are active when a right channel image is being projected. In the electronically switched filter case, the controller signals switching between left and right channel filters in synchronicity with the left and right image projections. In the filter wheel embodiment, for example, the controller maintains a rotational speed and synchronicity between the left and right channel images and the left and right channel filters respectively. The blended image as viewed through glasses 710 has a color space and white point that closely matches a color space and white point of projector 705 without filter 730.

The present invention includes an embodiment in which a filter wheel having left and right channel projection filters disposed thereon is placed inside a movie projector between the light source and integrating rod of the movie projector. The advantage of this placement is that the amount of light passing through the remaining optical components is reduced and less likely to overload sensitive electronics or other components (e.g. DLP, LCOS, or other light processors or light valves in the projector), but the amount of light that exits the projection is system is equivalent to embodiments where the projection filter(s) is placed further downstream locations. Alternatively, the power of the light source can be increased resulting in increased output without jeopardizing the integrating rod or other downstream components.

Further advantages to the described placement of the filter is that the filter can be made smaller than at most other points in the light patch, and at a reduced cost compared to larger filters. And, images formed after filtering are generally found to be sharper than images formed and then filtered.

In one embodiment, the projection filter is a filter wheel where approximately ½ the wheel has filter characteristics of a left channel filter according to the present invention and approximately ½ the wheel has filter characteristics of a right channel filter according to the present invention. Table 1 specifies an exemplary filter wheel specification for a multi-band filter having a left channel filter section and right channel filter section. The Delta values shown in Table 1 specify a slope (steepness) of the band edges. The T50 values specify the wavelength at the band edge where the light transmission is 50%. At the band pass wavelengths the transmission is at least 90%, and at the band reject wavelengths the transmission is less than 0.5%. The wheel may have, for example a diameter of approximately 125 mm diameter which is well suited for installation in a D-Cinema projector (e.g., projector 705) between the light source and integrating rod.

TABLE 1

Exemplary Filter Wheel Specification

| Delta $T_{0.5}$ T = 0.5% | Delta $T_{90}$ T = 90% | Right T = 50% | Left T = 50% |
|---|---|---|---|
| — | — | ↑<430 nm | |
| <8 nm | <2 nm | ↓440 nm +− 2 nm | |
| <8 nm | <2 nm | | ↑456 nm +− 2 nm |
| <8 nm | <2 nm | | ↓470 nm +− 2.5 nm |
| <8 nm | <2.5 nm | ↑484 nm +− 2.5 nm | |
| <10 nm | <3 nm | ↓498 nm +− 3 nm | |
| <10 nm | <3 nm | ↑511 nm +− 3 nm | |
| <10 nm | <2.5 nm | ↓526 nm +− 2.5 nm | |
| <10 nm | <2.5 nm | | ↑538 nm +− 2.5 nm |
| <10 nm | <3 nm | | ↓554 nm +− 2.5 nm |
| <10 nm | <3 nm | ↑568 nm +− 2.5 nm | |
| <12 nm | <3 nm | ↓584 nm +− 3 nm | |
| <12 nm | <3 nm | ↑610 nm +− 3 nm | |
| <12 nm | <3 nm | ↓621 nm +− 3 nm | |
| <12 nm | <3 nm | | ↑635 nm +− 3 nm |
| — | — | | ↓>690 nm |

The above exemplary specifications include some pre-blue-shifting consistent with the above-cited Richards et al patent application. However, inclusion of blue-shifting and other features is not required.

Table 2 specifies an exemplary set of viewing filters matching (or encompassing the passbands of the projector filters but also including a small amount of red shift). The filters include a multi-band filter for the left channel (or left eye lens) and a multi-band filter for the right channel (or right eye lens). The Delta values specify the slope (steepness) of the band edges. The T50 values specify the wavelength at the band edge where the light transmission is 50%. At the band pass wavelengths the transmission is at least 90%, and at the band reject wavelengths the transmission is less than 0.5%. These filters are, for example, placed on left and right lenses of glasses 715.

TABLE 2

Exemplary Viewing Filters

| Delta $T_{0.5}$ T = 0.5% | Delta $T_{90}$ T = 90% | Right T = 50% | Left T = 50% |
|---|---|---|---|
| — | — | ↑<430 nm | |
| <12 nm | <3 nm | ↓442 nm +− 3 nm | |

TABLE 2-continued

Exemplary Viewing Filters

| Delta $T_{0.5}$ T = 0.5% | Delta $T_{90}$ T = 90% | Right T = 50% | Left T = 50% |
|---|---|---|---|
| <12 nm | <3 nm | | ↑458 nm +− 3 nm |
| <12 nm | <3 nm | | ↓472 nm +− 3 nm |
| <16 nm | <4 nm | ↑486 nm +− 3 nm | |
| <16 nm | <4 nm | ↓528 nm +− 3 nm | |
| <16 nm | <4 nm | | ↑540 nm +− 3 nm |
| <16 nm | <4 nm | | ↓557 nm +− 3 nm |
| <20 nm | <5 nm | ↑571 nm +− 3 nm | |
| <22 nm | <6 nm | ↓624 nm +− 4 nm | |
| <23 nm | <6 nm | | ↑637 nm +− 5 nm |
| — | — | | ↓>700 nm |

Figure 8:
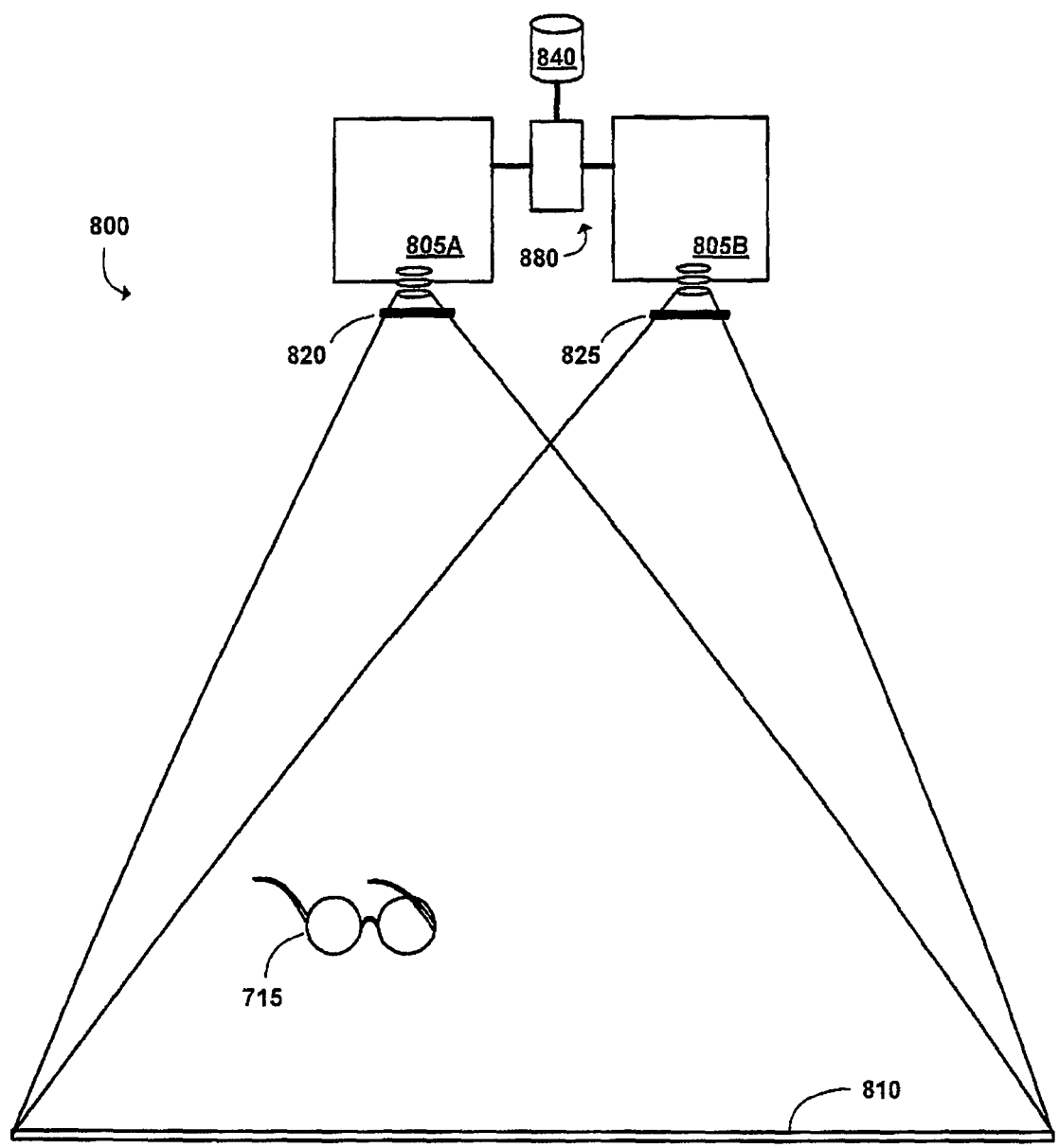
FIG. 8 is a drawing of a fixed filter arrangement in a two projector system according to an embodiment of the present invention.

FIG. 8 is a drawing of a fixed filter arrangement in a two projector system 800 according to an embodiment of the present invention. Left and right channel images are derived, decoded, retrieved, or reconstructed from data stored on disk drive 840 (or received from an appropriate network or transmission reception) by server 880. Color correction as described above may also be applied (not shown).

The decoded, color corrected (if applicable), left and right channel images are then projected simultaneously from left and right channel projectors 805A and 805B onto screen 810 for viewing through glasses 710. A right channel filter 820A having passband characteristics as described above is used to filter the projected right channel image. A left channel filter 820B having passband characteristics as described above is used to filter the projected left channel image. The right and left channel filters are fixed filters (e.g., filters with characteristics that do not change with time), and are constructed, for example, from a clear substrate (e.g., glass) coated with appropriate layers to produce the passbands for the desired left or right channel filter characteristics. The fixed filter may be located in the projector at any point in the optical path, or may be located outside the projector past the projection lens as shown in FIG. 8.

Although the present invention has been mainly described as increasing color space by increasing the number of passbands in the blue and green wavelengths (and interleaving those passbands between the left and right channels), the invention should not be limited to increasing the number of passbands in the same number or in the same wavelengths as specifically described herein, and, should include any number of increased passbands at any wavelength capable of being passed by the projection filter. For example, instead of dividing the blue primary into three sub-parts (2 subparts in one channel and one part in the other channel); the blue primary may be divided into four or more sub-parts (e.g., 3 sub-parts in one channel and 2 sub-parts in the other channel). Further, division of sub-parts as described herein may be performed at any of the available wavelengths and can therefore be extended into the red wavelengths.

In describing the preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a projector filter, any other equivalent device or device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to filters, passbands, coatings, glasses, controllers, projectors, display screens, networks or other transmission capabilities, etc should also be considered in light of any and all available equivalents.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

We claim:

1. A projector filter, comprising:
a first filter having a first set of primary passbands; and
a second filter having a second set of primary passbands;
wherein:
the first set of primary passbands has a different number of primary passbands than the second filter; and
the first filter has at least two blue primary passbands and the second filter has at least one blue primary passband.

2. A projector filter, comprising:
a first filter having a first set of primary passbands; and
a second filter having a second set of primary passbands;
wherein:
the first set of primary passbands has a different number of primary passbands than the second filter; and
the first filter has at least two green primary passbands and the second filter has at least one green primary.

3. A projector filter, comprising:
a first filter having a first set of primary passbands; and
a second filter having a second set of primary passbands;
wherein:
the first set of primary passbands has a different number of primary passbands than the second filter; and
the first filter has two blue primaries and two green primaries and the second filter has one blue primary and one green primary.

4. A projector filter, comprising:
a first filter having a first set of primary passbands; and
a second filter having a second set of primary passbands;
wherein:
the first set of primary passbands has a different number of primary passbands than the second filter; and
the first filter has passband wavelengths of approximately 400 to 440 nm and 484 to 498 nm, 514 to 528 nm, 567 to 581 nm, and 610 to 623 nm.

5. The projector filter according to claim 4, wherein the second filter has passband wavelengths of approximately 455 to 471 nm, 539 to 556 nm, and 634 to 700 nm.

6. The projector filter according to claim 5, wherein the passband wavelength specifications have a tolerance of approximately +−5 nm.

7. A projector filter, comprising:
a first filter having a first set of primary passbands; and
a second filter having a second set of primary passbands;
wherein:
the first set of primary passbands has a different number of primary passbands than the second filter; and
the projector color space is the color space of a D-Cinema projector.

8. A projector filter, comprising:
a first filter having a first set of primary passbands; and
a second filter having a second set of primary passbands;
wherein:
the first set of primary passbands has a different number of primary passbands than the second filter; and
the projector filter is an electronically switchable filter that switches between the first and second filters according to an image synchronization signal.

9. A system for projection of spectrally separated 3D images, comprising:
a projection system configured to project left and right channel images for display by a viewer;
a filter placed in at least one light path of the projection system comprising a left channel filter and a right channel filter;
wherein at least one of the left and right channel filters has more than 3 primary passbands.

10. The system according to claim 9, wherein one of the left and right channel filters has at least 2 primary passbands in blue wavelengths.

11. The system according to claim 9, wherein one of the left and right channel filters has at least 2 primary passbands in green wavelengths.

12. The system according to claim 9, wherein one of the left and right eye channel filters has at least 2 primary passbands in blue wavelengths and at least 2 primary passbands in green wavelengths.

13. The system according to claim 9, wherein the primary passbands of the filters are selected to maximize reproduction of a color space of the projection system in images projected by the projection system.

14. The system according to claim 9, wherein the filter is an electronically switchable filter that switches between the left channel filter and the right channel filter according to a left and right channel synchronization signal.

15. The system according to claim 9, further comprising a color correction module configured to color correct images projected by the projection system according to a color space of the filters.

16. A pair of projector spectral separation filters configured to divide a blue projector primary into three sub-parts, a green projector primary into three sub-parts, and a red projector primary into to two sub-parts.

17. The pair of projector spectral separation filters according to claim 16, wherein one of the filters has two passbands in blue, two passbands in green, and a single passband in red, and the other filter has one passband in blue, one passband in green, and one passband in red.

18. The pair of projector spectral separation filters according to claim 16, wherein one of the filters has two passbands in blue, one passband in green, and one passband in red, and the other filter has one passband in blue, two passbands in green, and one passband in red.

19. The pair of projector spectral separation filters according to claim 16, wherein one of the filters has one passband in blue, two passbands in green, and one passband in red, and the other filter has two passbands in blue, one passband in green, and one passband in red.

20. The projector spectral separation filter according to claim 16 where the sub-part passbands are located to achieve a substantial match to an original color space and white point of an unfiltered D-Cinema projector.

21. A color filter set, comprising:
a first filter having a first set of primary color passbands;
a second filter having a second set of primary color passbands of different wavelengths compared to the first set of primary colors;
wherein:
the first filter has more than one primary color in at least one color band; and
the filter set is embodied in an electronically switchable filter set.

22. A color filter set, comprising:
a first filter having a first set of primary color passbands;
a second filter having a second set of primary color passbands of different wavelengths compared to the first set of primary colors;
wherein:
the first filter has more than one primary color in at least one color band; and
the color filter set is part of a 3D projection system and the primary passbands of the first and second filters are selected to maximize reproduction of a color space of the 3D projection system without the first and second filters.

23. A method, comprising the step of:
preparing a 3D image comprising a left image and a right image;
filtering the left image with a left channel filter;
filtering the right image with a right channel filter; and
projecting the left and right filtered images onto a screen;
wherein at least one of the left channel filter and right channel filter have more than 3 primary passbands.

24. The method according to claim 23, wherein one of the left and right channel filters comprises 2 primary passbands in blue wavelengths and 2 primary passbands in green wavelengths.

25. The method according to claim 23, further comprising the step of viewing the projected 3-D image through left and right viewing filters having passbands that respectively exclude passbands of the right channel filter and the left channel filter.

26. The method according to claim 23, further comprising the step of switching the left and right channel filters in synchronicity with the projection of left and right channel images of the 3D image.

27. A filter system, comprising,
a first set of filters comprising a first set of optical passbands;
a second set of filters comprising a second set of optical passbands different from the first set of optical passbands and encompassing the first set of optical passbands.

28. The filter system according to claim 27, wherein the first set of filters is upstream in an optical path relative to the second set of filters.

29. The filter system according to claim 27, wherein the first set of filters comprise a projection filter and the second set of filters comprise a viewing filter.

30. The filter system according to claim 27, wherein, the first set of optical passbands comprises a right channel set of optical passbands and a left channel set of optical passbands that exclude any portion of the right channel set of optical passbands.

31. The filter system according to claim 27, wherein the second set of optical passbands include a left channel set of optical passbands and a right channel set of optical passbands that exclude any portion of the left channel optical passbands.

32. A method, comprising the steps of:
providing a theater audience with a pair of 3D viewing glasses comprising left and right lenses respectively comprising left and right viewing filters; and
projecting left and right images onto a display screen using left and right projection filters;
wherein the left projection filter and the left viewing filter comprise a first set of filters having unequal passbands and the right projection filter and the right viewing filter comprise a second set of filters having unequal passbands.

33. The method according to claim 32, wherein a total number of passbands in the viewing filters is less than a total number of passbands in the projection filters.

34. The method according to claim 33, wherein the projector filters comprise passbands that divide blue light wavelengths into at least three blue sub-parts and that divide green wavelengths into at least two green sub-parts.

35. The method according to claim 34, wherein a viewing filter in one of the asymmetric filter sets comprises a passband that encompasses wavelengths in the longest wavelength blue sub-part and wavelengths in a green sub-part.

36. The method according to claim 33, wherein the projector filters comprise passbands that divide green light wavelengths into at least three sub-parts and divide red light into at least two red sub-parts, and a viewing filter in one of the asymmetric filter sets comprises a passband that encompasses a longest wavelength green sub-part and a red sub-part.

37. The method according to claim 33, wherein the projector filters comprise passbands that divide blue light wavelengths into at least three sub-parts and green light wavelengths into at least three sub-parts, and a viewing filter in one of the asymmetric filter sets comprises a passband that encompasses a longest wavelength blue sub-part and a shortest wavelength green sub-part.

38. The method according to claim 33, wherein the projector filters comprise passbands that divide green light wavelengths into at least three sub-parts and red light wavelengths into at least three sub-parts, and a viewing filter in one of the asymmetric filter sets comprises a passband that encompasses a longest wavelength green sub-part and a shortest wavelength red sub-part.

39. The method according to claim 32, wherein each viewing filter comprises, three passbands exclusively comprising one passband including blue wavelengths, one passband including green wavelengths, and one passband including red wavelengths.

40. The method according to claim 32, wherein the projector filters comprise 3 passbands each in green and blue light wavelengths and two passbands in red wavelengths.

41. The method according to claim 40, wherein the viewing filters each exclusively comprises three passbands, one passband of blue wavelengths, one passband of green wavelengths, and one passband of red wavelengths.

* * * * *